United States Patent [19]

Barnette et al.

[11] Patent Number: 4,744,592

[45] Date of Patent: May 17, 1988

[54] LAMINATE AND METHOD FOR PROTECTING BOOKS

[75] Inventors: Charles J. Barnette, Akron; Gregory P. Brumbaugh, Stow, both of Ohio

[73] Assignee: Kent Adhesive Products Co., Kent, Ohio

[21] Appl. No.: 911,469

[22] Filed: Sep. 25, 1986

[51] Int. Cl.[4] .......................... B42D 3/02; B42D 3/00; B42D 3/12; B32B 3/04

[52] U.S. Cl. .................................... 281/15 R; 281/29; 281/34; 156/216

[58] Field of Search ................ 281/15 R, 19 R, 19 A, 281/20, 17, 29, 34, 35, 36; 156/216, 217; D19/26, 27; 205/450; 422/243

[56] References Cited

U.S. PATENT DOCUMENTS

| | | | |
|---|---|---|---|
| D. 235,439 | 6/1975 | Gray et al. | D19/26 |
| D. 244,024 | 4/1977 | Audeguy | D19/27 |
| 1,779,980 | 10/1930 | Mosher | 281/34 |
| 2,992,153 | 7/1961 | Lutwack | 156/216 |
| 3,043,737 | 7/1962 | Engelstein | 156/216 |
| 3,572,767 | 3/1971 | Learned et al. | 281/34 |
| 4,497,508 | 2/1985 | McHugh | 281/34 |
| 4,520,055 | 5/1985 | Jeter | 156/216 |

FOREIGN PATENT DOCUMENTS

| | | | |
|---|---|---|---|
| 77388 | 4/1918 | Switzerland | D19/27 |

*Primary Examiner*—E. R. Kazenske
*Assistant Examiner*—Paul M. Heyrana, Sr.
*Attorney, Agent, or Firm*—Oldham, Oldham & Weber Co.

[57] ABSTRACT

Laminate and method for protecting books using same. The laminate comprises a stiff rectangular sheet adhered through a pressure sensitive adhesive to a thin flexible transparent rectangular sheet, which is of the same height as but wider than the stiff sheet. The two sheets are juxtaposed so that 3 edges of each mutually coincide. The flexible sheet has a flexible rectangular side portion or extension to which the stiff sheet is not adhered. The stiff sheet is preferably of the same dimension as the book to be covered. To protect a book, one applies successively two laminates of preferred size so that each sheet is adhered to the outside of one book cover; and each flexible extension is adhered to the spine and the adjacent portion of the opposite cover. The back cover is preferably covered first. The laminates are cut to size when necessary. The spine and portions of each cover of a protected book have a two-ply covering, and the remaining portions of the book covers have one-ply coverings. This laminate is particularly useful for protecting paperback books and periodicals.

11 Claims, 3 Drawing Sheets

LAMINATE AND METHOD FOR PROTECTING BOOKS

TECHNICAL FIELD

This invention relates to a laminate for protecting the outside surfaces of a book, magazine, or the like; to a method for protecting such outside surfaces using such laminate, and to a book, magazine or the like so protected. More particularly, this invention relates to a laminate for covering books, especially paperback books, for protective purposes, to a method for covering books using such laminate, and to a book so covered.

BACKGROUND ART

A large number of books are published each year in paperback form. These include textbooks and reference books, classics and best sellers, novels and non-fiction works—in short the whole gambit of published books. While many books, notably classics and best sellers, are available in both hard cover and paperback form, a large number of books are published only in paperback form. The latter include not only throwaway novels, but also textbooks and reference books to which the owner refers again and again. A paperback book can be published at much lower cost than that of the same book in hard cover form. For this reason, many books, including textbooks and reference books of limited circulation, are published only in paperback form. On the other hand, paperback books are much less durable than hard cover books. If the owner of a paperback book re-reads it or refers back to it frequently, as he may in the case of a textbook or reference book, the book soon becomes dogeared. The front cover, particularly, becomes worn due to the application of thumb pressure every time the book is opened.

Dust covers which are widely used on hard cover books, offer very little protection to paperbacks. They may protect the covers from stains, but they do nothing to strengthen the covers so that the book can withstand repeated use.

Other printed works, including hardback books, magazines or other periodicals, pamphlets and reprints, are also subject to wear if used frequently. For example, magazines in physicians' offices, and periodicals in technical libraries may be read or referred to frequently by different readers and may become worn or torn in the process. The same may also be true of pamphlets and reprints of articles which are read or referred to frequently. Even hard cover books may lose their freshness if used frequently, because most hard cover books are bound with cloth bindings, which are not stain proof and which become stained from oil and dirt on the fingers of the users after repeated use.

A commercially available laminate for protecting books comprises a pair of identically spaced transparent rectangular sheets, laminated to a thin flexible transparent sheet in spaced apart relationship so that the resulting laminate has stiff portions at either end and a flexible portion in the middle. The middle portion is just slightly wider than the spine of the book to be protected. To apply this laminate to a book, one lays the spine of the book on the middle portion of the laminate, and presses the two stiff sheets, which are adhesive coated, against the covers of the book. Finally, one trims off any excess laminate.

The laminate described above has several disadvantages. First, it must be provided in at least two sizes having middle portions of different widths, to accommodate books of different thicknesses (i.e. different spine widths). Second, even with different sizes available, the middle portion of the laminate will usually be slightly wider than the spine width of the book, so that either the edges of the stiff sheets do not coincide with the edges between the covers and the spine of the book, or the flexible portion of the laminate covering the spine is slightly wrinkled. In fact, it is difficult to avoid wrinkles in any case when applying this laminate to a book.

DISCLOSURE OF THE INVENTION

An object of this invention is to provide a laminate which is suitable for snugly and adherently covering and thereby protecting a variety of printed works, including hardback and paperback books, periodicals, pamphlets and reprints.

A further object of this invention is to provide a laminate which is especially suitable for covering and thereby protecting paperback books.

A particular object of this invention is to provide a laminate for protecting paperback books in which the laminate size matches the book size so that no cutting or trimming is necessary.

An alternate object of this invention to provide a laminate which will fit snugly on books having widely differing cover sizes.

It is a further object of this invention to provide a laminate which affords extra protection to the spine and the edges between the spine and the covers of a book.

It is a still further object of this invention to provide a laminate which is easily applied to a paperback book and which will not mar the appearance thereof.

A further object of this invention is to provide a laminate which gives a high degree of protection from thumbing to the front cover of the book.

Other objects are to provide a novel method for covering a book with an adherent laminate, and to provide a book so covered.

These and other objects will be apparent from the specification which follows.

According to this invention there is provided a laminate for protecting the outside surfaces of a book, said laminate comprising:

(a) a stiff rectangular sheet having a width and height at least as great as the width and height, respectively, of the covers of the book to be protected;

(b) a first adhesive coating on one surface of said stiff sheet;

(c) a first release liner covering said first adhesive;

(d) a thin flexible transparent rectangular sheet bonded to the other surface of said stiff sheet, said flexible sheet being of the same height but of greater width than said stiff sheet, said flexible sheet being bonded to said stiff sheet with the top and bottom edges of stiff and flexible sheets aligned, whereby said flexible sheet has a main portion that is adhered to said stiff sheet, and at least one flexible extension which is not so adhered;

(e) a second adhesive coating on at least the exposed portion of the surface of said flexible sheet which is adhered to said stiff sheet;

(f) a second release liner covering the exposed portion of said second adhesive.

The term "book" as used herein shall mean and include any set of two or more sheets that are bound or fastened together along one edge, either with or without a cover and shall include hardback books paperback books, other soft or flexible cover books, periodicals, reprints of articles, pamphlets, and single sheets which have been folded once in the middle to give a four-page or folio format. The term, cover, as used herein shall mean and include not only a cover in the usual sense (e.g., a hardback, paperback or magazine cover), but also the outside sheet (or sheets) of a work (a pamphlet or a reprint of an article, for example) in which the outside sheet is no different from the other sheets, or in which there are no inside sheets (as for example in a four-page pamphlet or reprint).

BEST MODE FOR CARRYING OUT INVENTION

This invention will now be described with reference to the accompanying drawings, which illustrate a laminate and a method of protecting a book using this laminate, according to a preferred embodiment of this invention. The description of the preferred method herein will be with particular reference to covering a paperback book, since the covering of paperback books is the preferred use of the laminate of this invention. It will be evident, however, that the method described herein is also applicable to the covering of other types of books as defined in this specification.

Figure 1:
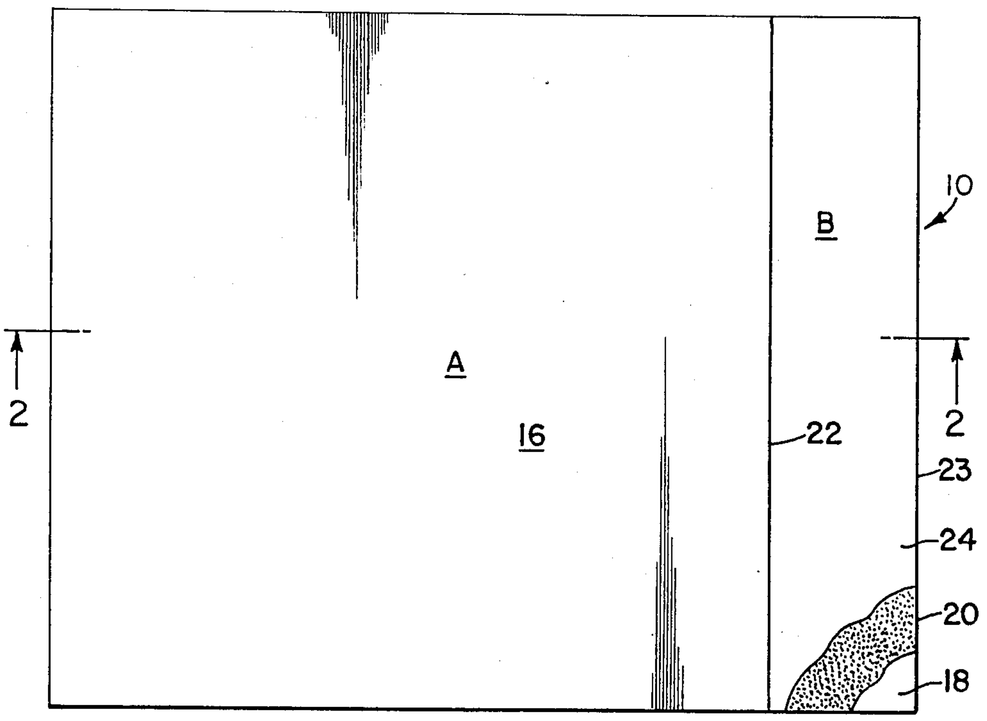
FIG. 1 is a plan view of a laminate according to this invention.
Figure 2:
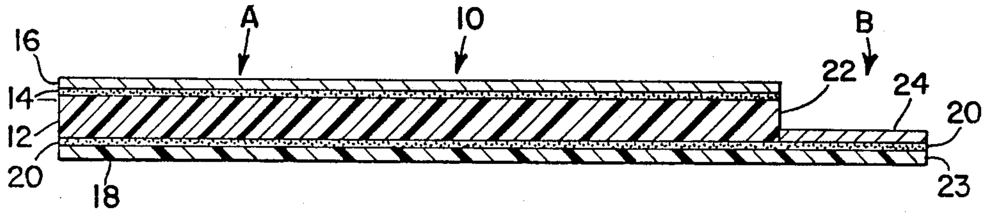
FIG. 2 is a vertical sectional view of the laminate taken along line 2—2 of FIG. 1.

A laminate 10 according to this invention is shown in FIGS. 1 and 2. referring to FIGS. 1 and 2, laminate 10 comprises a stiff, rectangular sheet 12, which is adapted to cover the outside surfaces of a book, and which has a height and width at least as great as the width and height, respectively, of the covers of the book to be protected. Sheet 12 may be either opaque, translucent or transparent, preferably transparent or translucent so that the book title or other printed matter on the back cover may be read. Sheet 12 may be made of a suitable metallic or plastic material, preferably transparent plastic, which is stiff even in thin sheets. An acid-free sheet material is preferred. A particularly preferred material is rigid polyvinyl chloride (PVC). The thickness of sheet 12 is not critical as long as it is thick enough to be stiff and not so thick as to be unwieldy or to undergo permanent curl so that it can not be flattened. (Thick PVC sheets have memory so that they cannot be flattened after they cure a bend). A thickness of about 8 to 20 mils (0.008" to 0.020", or about 0.2 to 0.5 mm) preferably about 10 mils is highly desirable.

One surface of sheet 12 is coated with a pressure sensitive adhesive 14. This pressure sensitive adhesive is preferably a permanent adhesive, i.e. one which quickly develops such strong adhesive forces with the surface to which it is adhered that removal of the adhesive and sheet 12 becomes impossible. Suitable polymeric adhesive materials, particularly certain acrylics meeting this requirement of permanency are well known. The adhesive should have a pH of about 7, since an acidic material will tend to cause yellowing and degradation of the paper to which it is applied. This layer of first adhesive 14 is covered with a first release liner 16. Release liner 16 may be a conventional release liner, e.g. paper coated on one surface (the surface applied to the adhesive) with a conventional release material such as a silicone.

Laminate 10 also includes a thin flexible acid free transparent rectangular sheet 18, which is of the same height as but of greater width than stiff sheet 12. The width and height of flexible sheet 18 are the same as those of laminate 10 as a whole. Flexible sheet 18 is coated on one surface with a second pressure sensitive adhesive 20, which is also of the permanent type. The second pressure sensitive adhesive is also preferably a permanent acrylic having a pH of about 7. The first and second adhesive materials may be the same or different. Flexible sheet 18 is laminated to stiff sheet 12 through adhesive coating 20.

The stiff sheet 12 and the thin flexible sheet 18 are laminated so that 3 edges of each, i.e. the top, bottom and one side edge are aligned with the corresponding edges of the other sheet. Since flexible sheet 18 is wider than stiff sheet 12, it is apparent that the fourth edges 22 and 23 of stiff sheet 12 and flexible sheet 18, respectively, do not coincide, or, in other words, they are unpaired. Flexible sheet 18 has a main portion which is adhered to stiff sheet 12 and a flexible extension or side portion which is not so adhered. The extension is that portion which extends beyond the fourth edge 22 of stiff sheet 12. Since this extension is not laminated to stiff sheet 12, it is free to flex (or more simply, it is flexible). This flexible extension includes the entire length of side edge 23.

The first adhesive 14 coats the exposed surface of stiff sheet 12, i.e., the surface which is not bonded to flexible sheet 18.

The second adhesive 20 covers one entire surface of flexible sheet 18, including both the portion of that surface which is adhered to stiff sheet 12 and the portion which is not so adhered (the exposed portion). The exposed portion of this second adhesive 20 is covered with a second release liner 24. This second release liner 24, like the first, may be a conventional release liner material such as paper coated on one surface with a suitable release material such as a silicone.

The flexible sheet 18 may be made of a plastic material which is flexible and yet strong in thin sheets. Polyester film, (e.g. "Mylar") is ideal. An advantage of polyester is that adjacent sheets of polyester will not stick to each other. (Adjacent PVC sheets, in contrast, will stick together). This advantage is significant when two books, both protected according to this invention, are placed side by side on a bookshelf. Flexible sheet 18 is ordinarily much thinner than stiff sheet 12; flexible sheet 18 may have a thickness of about 1 to 5 mils (0.001" to 0.005", or 0.025 to 0.125 mm), preferably about 2 mils (0.002" or about 0.05 mm). Thickness dimensions are greatly exaggerated in the drawings.

It is apparent from the foregoing description that laminate 10 has a stiff portion A, formed by stiff sheet 12 and the portion of flexible sheet 18 laminated thereto, and a flexible portion B, which is formed by the extension or portion of flexible sheet 18 which is not laminated to stiff sheet 12. It is also apparent that flexible portion B of laminate 10 includes the entire length of one side edge of laminate 10 and of flexible sheet 18 (i.e., the unpaired edge 23 thereof).

Stiff sheet 12 is rectangular in shape, including (but not necessarily) square. The width and height of stiff sheet 12 (which are also the width and height of stiff portion A of laminate 10) must equal or exceed the width and height, respectively, of the cover of the book to be protected. In a preferred embodiment, stiff sheet 12 has the same dimensions as those of the cover of the book to be protected. Thus, a laminate 10 whose stiff sheet 12 measures 4 inches×6⅞ inches is preferred for protecting a paperback book having a cover and page size of 4×6½ inches (a common paperback book size). Books come in a wide range of sizes from pocketbook size to 8½×11 inches and occasionally larger. For instance, the cover of a paperback novel may be as small as 4 inches×6⅞ inches (textbooks and reference books may be as large as 8½ inches×11 inches), and it is impractical to provide laminate 10, having a stiff sheet 12 larger than the cover of the book to be protected, in all paperback book sizes except for all but the most common sizes. Thus, the stiff sheet 12 must be at least 8½ inches×11 inches if the laminate is to be suitable for protecting all or most paperback books.

The width of the extension portions of flexible sheet 18 (i.e., that of the flexible portion B of laminate 10) must equal or exceed (preferably exceed) thickness of the book to be covered. (The thickness of the book is the same as its spine width). For protecting 4×6⅞ inch paperback books, flexible portion B should have a width of at least 2 inches (to allow for book thicknesses up to 2 inches).

The height of the extension portion of sheet 18 (which is the same as the height of the rest of the sheet) must equal or exceed the cover height (or page height) of the book.

By way of specific example, a custom sized laminate 10 for covering a 4×6⅞ inch paperback book may have an overall size of 6×6⅞ inches, including a stiff portion A measuring 4×6⅞ inches (the same as the book cover dimension) and a flexible portion B measuring 2×6⅞ inches. The width of flexible portion B is sufficient for covering any book up to 2 inches thick.

By way of another specific example, a "universal size" laminate 10, intended to be cut down to the size of the book to be protected, may have a flexible sheet 14 inches×18 inches laminated to a stiff sheet 14 inches square. The dimensions of flexible portion B of laminate 10 in this case are 4 inches×18 inches, which exceed the dimensions of virtually every paperback book published. These dimensions are merely representative; other dimensions can be used.

A preferred method of protecting a book will now be described with reference to FIGS. 3-9. Either one or two laminate sheets 10 are required, depending on the relative sizes of the laminate 10 and the book to be protected.

Only one laminate sheet 10 is required when the height of this sheet equals or exceeds twice the height of the book.

Figure 9:
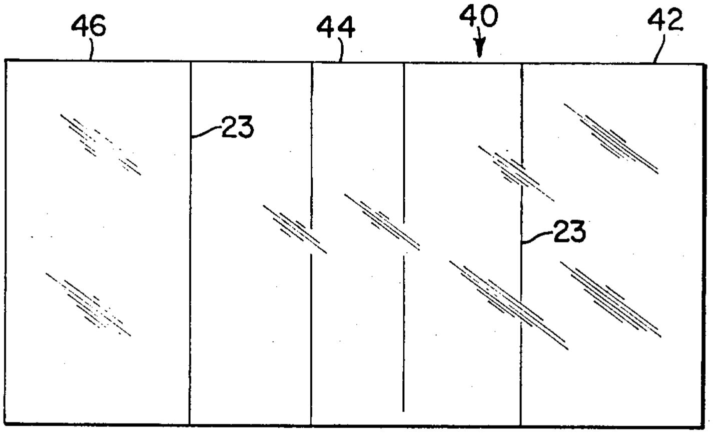
FIG. 9 is an elevational view of a book protected according to this invention, looking toward the outside covers of an open book.

The book to be protected may be a paperback book 40 of conventional construction, comprising a flexible (or paperback) front cover 42, a spine 44, a flexible (or paperback) back cover 46, and pages 48, as shown in FIG. 9. The preferred book to be protected is a book having flexible covers, and a spine, e.g., a paperback book or a magazine or other periodical. The book may also be a hardback book, or any other item included in the term, "book", as heretofore defined. Usually the papes of the book are joined together along one edge, generally the left edge, (however, "book" as used herein can even include a plurality of pages stapled together near one corner, or assembled loose with edges aligned). The steps in protecting a book will be described with particular reference to a paperback book, since paperback books and periodicals are the preferred articles to be protected according to this invention. It is believed that the method for protecting any type of book will be evident from the description which follows.

Figure 3:
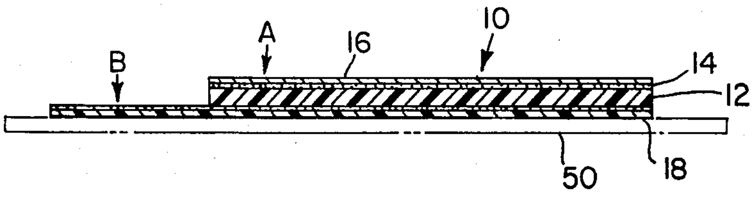
FIGS. 3-8 are schematic views showing the steps in protecting a paperback book with a laminate of this invention.

The steps in protecting a paperback book according to the method of this invention are as follows:

When the height of laminate 10 exceeds the height of the book to be covered, the following preliminary steps are required:

1. Place laminate 10 on top of a table 50 as shown in FIG. 3.

Figure 4:
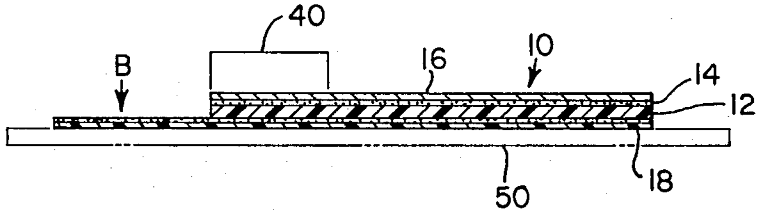

2. Lay book 40 to be protected down on top of the laminate 10, so that the back cover 46 is on top of stiff sheet 12 and first release liner 16 of the laminate, with the bottom and left edges of the book aligned with the bottom and unpaired edge 22, respectively, of stiff sheet 12, as shown in FIG. 4.

Figure 5:
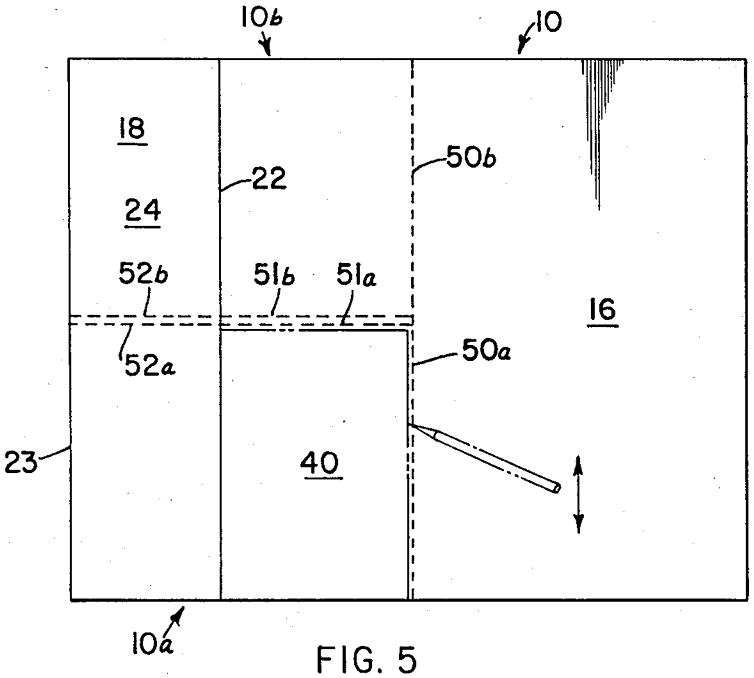

3. Draw an outline 50*a*, 51*a* (shown as a broken line) of the book 40 on first release liner 16. Extend line 51*a* across second release liner 24 as line 52*a*. This step is shown in FIG. 5.

4. Cut the laminate 10 along lines 50*a*, 51*a* and 52*a*. Use of a paper cutter is preferred, although heavy duty scissors may be used. The rectangular laminate 10*a* thus cut out has the same construction as the original laminate 10, but is of smaller size; i.e., the stiff sheet of the cut out laminate has the same dimensions as those of the covers of the book to be protected.

5. Repeat steps 2, 3 and 4. This gives a second laminate 10*b* which is identical to laminate 10*a*. Where the height of the original laminate sheet 10 is at least twice the cover height of the book, the original laminate sheet may be used and lines 50*b*, 51*b* and 52*b* (analogous to lines 50*a*, 51*a*, and 52*a*) may be drawn thereon as shown in FIG. 5. (Lines 51*b* and 52*b* will coincide with lines 51*a* and 52*a*, respectively, where the height of the original laminate 10 is exactly twice the cover height of the book. This situation would obtain, for example, when the original laminate sheet 10 is 14 inches wide and the cover height of the book is 7 inches). A second laminate sheet 10 must be used if the cover height of the book to be protected is more than one-half the height of laminate 10.

Steps 1 through 5 provide a pair of identical laminates 10*a* and 10*b* having the same structure as the original laminate, in which the dimensions of the stiff sheet of each laminate 10*a* and 10*b* are the same as the dimensions of the covers of the book to be protected, and in which the length of the extension portion of the flexible sheet of each laminate exceeds the spine width of the book and the height of each extension portion is equal to the height of the book cover. Steps 1 through 5 can be omitted when the original laminate 10 has the required dimensions.

The steps which follow are required in all cases.

6. Place a laminate sheet 10 on a table top with the uncoated side of flexible sheet 18 down and with the flexible portion B to the left. Preferably unpaired edge 22 of stiff sheet 12 is aligned with a table top edge, so that stiff portion A of laminate 10 rests on the table top and flexible portion B overhangs the edge.

7. Place book 40, front cover 42 up, on top of stiff portion A of laminate 10. The edges of the back cover 46 should be aligned with the corresponding edges of the stiff sheet 12, and the left edge of the cover 46 (the intersection between back cover 46 and spine 44) should coincide with the unpaired edge 22 of sheet 12.

Figure 6:
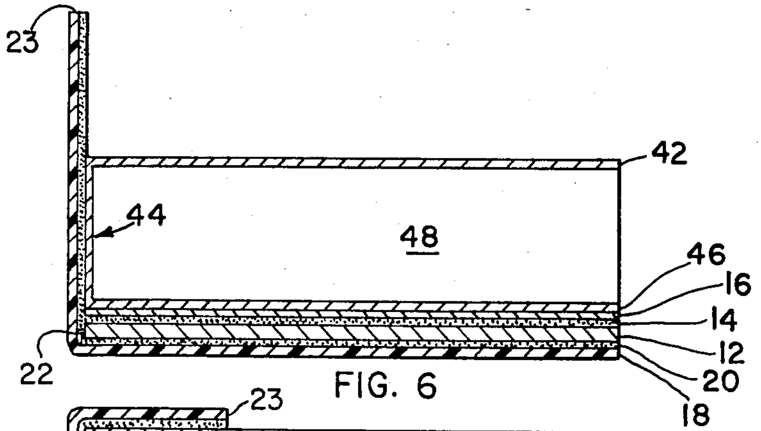

8. Remove release liner 24 from flexible sheet 18 and pull the free portion of flexible sheet 18 around, as shown in FIG. 6. Care should be taken to pull flexible sheet 18 taut in order to avoid wrinkles and to smooth out any bubbles that may form. This will cause the flexible sheet 18 to adhere to the spine 44 and to that portion of the front cover 42 which is closest to the spine 44. In FIG. 6, the arrow denotes direction of movement of flexible sheet 18. When this step is completed, the unpaired edge 23 of flexible sheet 18 will overlie front cover 42 somewhat to the right of spine 44.

Figure 7:
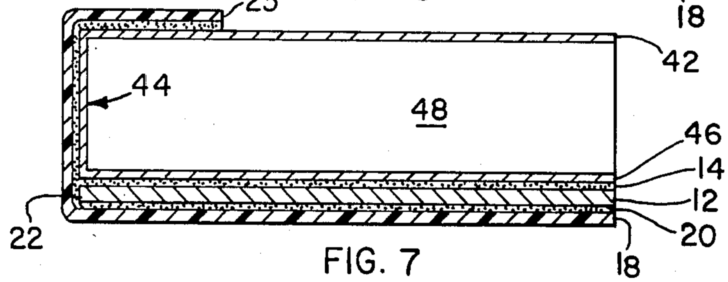

9. Remove the first release liner 16 from stiff sheet 12 and press sheet 12 against the back cover 46 of book 40. Book 40 appears as shown in FIG. 7 on completion of this step.

10. Repeat steps 6 to 9, using a second laminate sheet 10 and placing the front cover 42 of the book down on top of stiff portion A of the laminate.

Figure 8:
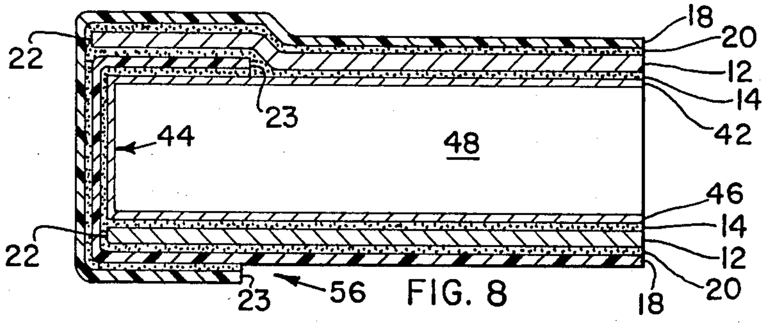

The protected book 40 is shown in FIGS. 8 and 9. As shown especially in FIG. 8, stiff sheets 12, 12 are adhered to the outside of back cover 46 and front cover 42. (actually a portion of flexible sheet 18 of the first laminate 10 applied is interposed between front cover 42 and stiff sheet 12 of the second laminate, as may be seen in FIG. 7). The two flexible sheets are adhered to the spine 44 and outsides of front cover 42 and back cover 46, also as shown in FIG. 8. There is a double thickness of flexible sheet covering spine 44 and the portions of the front and back covers which are closest to the spine. This gives extra protection to the portions of the book which are subject to greatest wear. The unpaired edges 23 of flexible sheets overlie front and back covers 42 and 46, respectively, a short distance to the right of spine 44. Unpaired edge 23 on front cover 42 is hidden by the second stiff sheet 12. Edge 23 on back cover is exposed. Even this edge is not readily apparent because sheets are thin and transparent. It is advantageous to cover the back cover 46 of book 40 first, so that the less visible edge 23 will be on the front cover.

Various modifications can be made without departing from the scope of this invention.

Flexible sheet 18 can be bonded to stiff sheet 12 by means other than adhesive coating 20 if desired. For example, flexible sheet 18 can be directly bonded, e.g., by fusion bonding, to stiff sheet 12, or the two sheets may be joined through another adhesive. It is preferred to bond flexible sheet 18 to stiff sheet 12 through adhesive coating 20 for reasons of economy and convenience.

Instead of having one flexible extension or side portion B as shown, laminate 10 may have two flexible side portions, one on either side of stiff sheet 12. This arrangement gives certain advantages in layout for cutting two pieces from laminate 10. In this alternative arrangement the width of stiff sheet 12 must be at least twice the cover width of the book to be covered, and the height of stiff sheet 12 (which is also the height of laminate 10) need not be any greater than the page height of the largest book to be covered. Each extension must be wider than the thickness of the book to be covered. (This embodiment is not shown in the drawings).

The laminate and the method of applying this laminate to a book for protective purposes has several advantages over laminate and methods of protecting books therewith which are presently known. First, one size of composite laminate sheet 10 of this invention can be used on all sizes of books on the market. Of course, if one so desires, laminate 10 can be manufactured in more than one size for use on different sizes of books, in order to reduce the amount of material thrown away or (if a laminate is manufactured for a specific book size) to make it unnecessary to do any cutting. An advantage of the method of this invention is that no cutting or trimming of the laminate is required after it has been applied to a book; all cutting is done before any portion of the laminate is joined to the book. Another advantage of the present invention is that the thin flexible sheets can be applied smoothly, with no wrinkling, and the stiff sheets coincide with the front and back covers of the book. A further advantage of this invention is that the stiff sheets are placed on the outsides of the book covers; this gives greater protection than that available in any presently known laminate or method of application thereof to a book, since the outside of the front cover suffers more wear (from thumbing) than any other portion of a book. A still further advantage of this invention is that a two-ply thickness of flexible sheet covers the spine and the edges thereof where the spine and covers intersect. Since these edges are high wear portions of a book, the life of the book is greatly prolonged. Also, a book covered according to this invention has a pleasing appearance.

While in accordance with the patent statutes, a preferred embodiment and best mode has been presented, the scope of the invention is not limited thereto, but rather is measured by the scope of the attached claims.

What is claimed is:

1. A laminate for protecting the outside surfaces of a book having a spine, said laminate comprising:

(a) a stiff rectangular sheet having a width and height at least as great as the width and height, respectively, of the covers of the book to be protected;
(b) a first pressure sensitive adhesive coating on one surface of said stiff sheet;
(c) a first release liner covering said first adhesive;
(d) a thin flexible transparent rectangular sheet bonded to the other surface of said stiff sheet, said flexible sheet being of the same height as but greater width than said stiff sheet, said flexible sheet being bonded to said stiff sheet with the top and bottom edges of stiff and flexible sheets aligned, whereby said flexible sheet has a main portion that is adhered to said stiff sheet, and at least one flexible extension which is not so adhered, said extension being adapted to cover the spine of said book;
(e) a second pressure sensitive adhesive coating on at least the exposed portion of the surface of said flexible sheet which is adhered to said stiff sheet;
(f) a second release liner covering the exposed portion of said second adhesive.

2. A laminate according to claim 1 in which the width of said extension is greater than the thickness of the book to be covered.

3. A laminate according to claim 1 in which said second adhesive coating covers one entire surface of said flexible sheet and said flexible sheet is adhered to said stiff sheet through said second adhesive.

4. A laminate according to claim 3 in which said first and second adhesives are permanent adhesives.

5. A laminate according to claim 1 in which said stiff sheet is transparent.

6. A laminate according to claim 1 in which the top, bottom and one side edge of each sheet are aligned with the corresponding edges of the other sheet, so that said flexible sheet has one flexible extension, said flexible extension including the entire length of one side edge of said flexible sheet.

7. A laminate according to claim 1 in which said stiff sheet has a thickness of about 8 to 20 mils.

8. A laminate according to claim 1 in which the dimensions of the stiff sheet are the same as the dimensions of the covers of the book to be protected, and the width of the flexible extension is greater than the thickness of the book.

9. A laminate according to claim 8 in which the top, bottom and one side edge of each sheet are aligned with the corresponding edges of the other sheet, so that said flexible sheet has one flexible extension, said flexible extension including the entire length of one side edge of said flexible sheet.

10. A book protected from wear due to repeated use, said book comprising:

(a) front and back rectangular covers, a spine connecting said covers, and pages between said covers and secured to said spine;

(b) identical first and second stiff rectangular sheets affixed by pressure sensitive adhesive to the outsides of said front and back covers, respectively, (c) identical first and second thin flexible transparent rectangular sheets adhered to said first and second stiff sheets, respectively, each of said flexible sheets being of the same height as but greater width than said stiff sheets, the top, bottom and one side edge of each flexible sheet being aligned with the top, bottom and one side edge, respectively, of the stiff sheet to which it is adhered, so that each of said flexible sheets includes a flexible extension which is adhered to said spine and a portion of the opposite cover of said book;

(d) whereby said first and second flexible sheets overlap and provide a double thickness of flexible sheet covering said spine and the portions of said front and back covers adjacent thereto.

11. A book according to claim 10 in which said stiff sheets are also transparent.

* * * * *